United States Patent [19]
Christofferson et al.

[11] Patent Number: 6,115,038
[45] Date of Patent: Sep. 5, 2000

[54] METHOD FOR CREATING LOWER COST REAL-TIME 3D GRAPHICS IN A DISTRIBUTED ENVIRONMENT

[75] Inventors: Carl L. Christofferson, Seattle, Wash.; Frank C. Christofferson, Broomfield, Colo.

[73] Assignee: Christofferson Enterprises, LLC, Oakton, Va.

[21] Appl. No.: 09/112,588

[22] Filed: Jul. 9, 1998

Related U.S. Application Data

[60] Provisional application No. 60/052,807, Jul. 9, 1997.

[51] Int. Cl.⁷ .................................................. G06F 15/00
[52] U.S. Cl. ............................................................. 345/331
[58] Field of Search ........................... 345/326, 329, 345/331, 333, 334, 335, 418

[56] References Cited

U.S. PATENT DOCUMENTS

| | | | |
|---|---|---|---|
| 5,608,872 | 3/1997 | Schwartz et al. | 395/200.04 |
| 5,704,042 | 12/1997 | Hester et al. | 395/200.34 |
| 5,944,785 | 8/1999 | Pommier | 345/331 |

*Primary Examiner*—Phu K. Nguyen
*Attorney, Agent, or Firm*—Clyde R Christofferson

[57] ABSTRACT

An architecture for delivering up-to-date graphics technology to a mass market, locating rapidly chaning graphics technology on a central server and partitioning application functions between server and distributed consoles in such a fashion that upgrades in graphics technology do not require corresponding upgrades in the consoles or in functions allocated to the consoles. Multiple instances are provided of the graphics technology, and these instances are switched to active applications and consoles.

1 Claim, 1 Drawing Sheet

METHOD FOR CREATING LOWER COST REAL-TIME 3D GRAPHICS IN A DISTRIBUTED ENVIRONMENT

BACKGROUND OF THE INVENTION

This patent application is a continuation in part of provisional application Ser. No. 60/052,807 of the same title filed on Jul. 9, 1997.

FIELD OF THE INVENTION

The present invention generally relates to systems for distributing three dimensional graphics in real-time, and in particular to methods for structuring such distribution systems to maintain continuity and provide effectively for changes in graphics technology over time in a mass market.

BACKGROUND DESCRIPTION

Three dimensional graphics is becoming critical to the future of computer software and hardware. Increasingly, applications will require the ability to create or render 3-dimensional representations within images. These 3D images provide a natural communication medium for visually-oriented humans. The advent of affordable 3D computer technology is taking this out of the realm of research and military simulation and into the mainstream commercial market dominated by personal computers (PC's) and low cost set-tops, or consoles.

The rendering of 3D images involves the creation of a database describing a 3D object or environment, the mathematical transformation of this database into surfaces such as polygons that can be further transformed into 2D representations, suitable for display as projected 3D information on a 2D display. The methods for these transformations are well known, and have been implemented in both software and hardware for many years.

Reducing the cost of generating real-time 3D graphics may become critical to the advance of computer software applications. Visualization for education and training, financial analysis, interactive advertising and other areas will rely on 3D methods, and have been explored in academic and professional circles for over a decade. As 3D technology becomes more sophisticated and pervasive, it will possibly become the preferred paradigm for human/computer visual interaction. This would leverage the lifetime of 3D visual training the majority of humans undergo, where huge portions of our cognitive capacity relates to interpretation of 3D visual information.

Content is the material which is conveyed to customers over a communications medium. Although content is infinitely variable, the methods for conveying it are limited by practical considerations, such as mass market methods for distribution. Magazines, newspapers, books, film and television are all examples of widely used mediums for distribution of content. These are largely passive methods of content delivery.

Computer technology enables the creation and distribution of interactive content. Three dimensional images are one form of delivery of that content, allowing communication in that familiar paradigm. The delivery of 3D images and content to customers currently takes place in stand-alone and distributed computer systems. Stand alone systems (such as video game consoles) usually rely on delivery of pre-generated programs and images via a hard medium such as a disc or cartridge. Distributed systems (such as the Internet or private intranets) allow more dynamic offerings. This latter model is likely the superior distribution method for the future, allowing much more current and dynamic content.

In the current network model, storage and caching of content and applications take place on a centralized server, but the actual software applications execute on a system in the customer's user space (home or office). This is the client/server model. This allows the server to supply resources beyond the constraints of a remote terminal, while taking advantage of cost-effective desktop systems for some tasks.

Currently, any implementation of systems delivering 3D graphics to a user involves graphics hardware local to the user. This entails several critical deficiencies. Firstly, this requires a costly set-top, where each user requiring 3D graphics must have appropriate hardware. Secondly, since 3D technology is in constant flux, these expensive systems must be continually upgraded, creating an additional expense and a logistical burden. Finally, the nature of this remote hardware eliminates the possibility of central maintenance and coordination of configurations, an important capability, and one which is critical to many applications.

One solution proposed is the placement of low-cost integrated 3D graphics chips in the user system. This solution is deficient because even with mass-market production scales, any such solution would rapidly become obsolete.

Another solution is generally programmable graphics hardware within the user system. This too is impractical, as the capacity of such a system is inherently static and limited.

Service providers cannot afford to place constantly-upgraded hardware on customer premises. The only current market solution which allows the placement of the latest technology in the customer's hands relies on the frequent purchase and upgrade of that product by the customer, such as in the PC model. Yet this method is untenable for the mass-market, as it requires massive outlays to stay current, and does nothing to ameliorate the configuration coordination problem.

Given current solutions, 3D graphics requires frequent updates to the consumers platform, and thus low-cost consumer platform is unattainable. An alternative is to ignore 3D software innovations, a poor choice given the apparent value of 3D graphics.

SUMMARY OF THE INVENTION

It is therefore an object of the present invention to provide central maintenance and coordination of rapidly evolving configurations for delivery of real-time graphics to a mass market.

Another object of the invention is to avoid obsolescence in the graphics delivery technology experienced by end users in a distributed mass market.

It is a further object of the invention is to provide a lower cost model for consistent delivery of up-to-date real-time 3D graphics peformance over extended time periods when graphics technology is rapidly evolving.

The need for rapid introduction of new solutions to answer the 3D challenge will accelerate the current cycle of demand, innovation, and obsolescence of hardware products. Improved 3D products immediately capture customer attention, permanently raising the bar for all vendor solutions.

Methods to cost effectively deliver this important technology are essential to its wide-spread acceptance and use. This invention describes a technology which enables a mass-market delivery solution for 3-D graphics, which addresses key impediments to acceptance.

The invention provides an architecture for delivering up-to-date graphics technology to a mass market. It focuses on the critical responsiveness in a mass market to improvements in graphics technology (hardware and software) for generating 3D images for human users in real time. This graphics technology is configured to be usable by multiple applications, and multiple instances of the technology are located on a central server. The server provides 3D images in real time to users at a plurality of distributed consoles, using a high speed communications channel. The applications are partitioned between the server and the distributed consoles. There is a network communication channel for communication between console and server, and for executing application functions allocated to the console. Means are provided for switching the multiple instances of the graphics technology those applications and consoles which are active at any one time. The graphics technology is configured at the server to be able to install improvements in this technology at the server without requiring corresponding improvements at the consoles. Similarly, the applications are partitioned between server and console so that they may be responsive to improvements in graphics technology without increasing functions allocated to the consoles.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
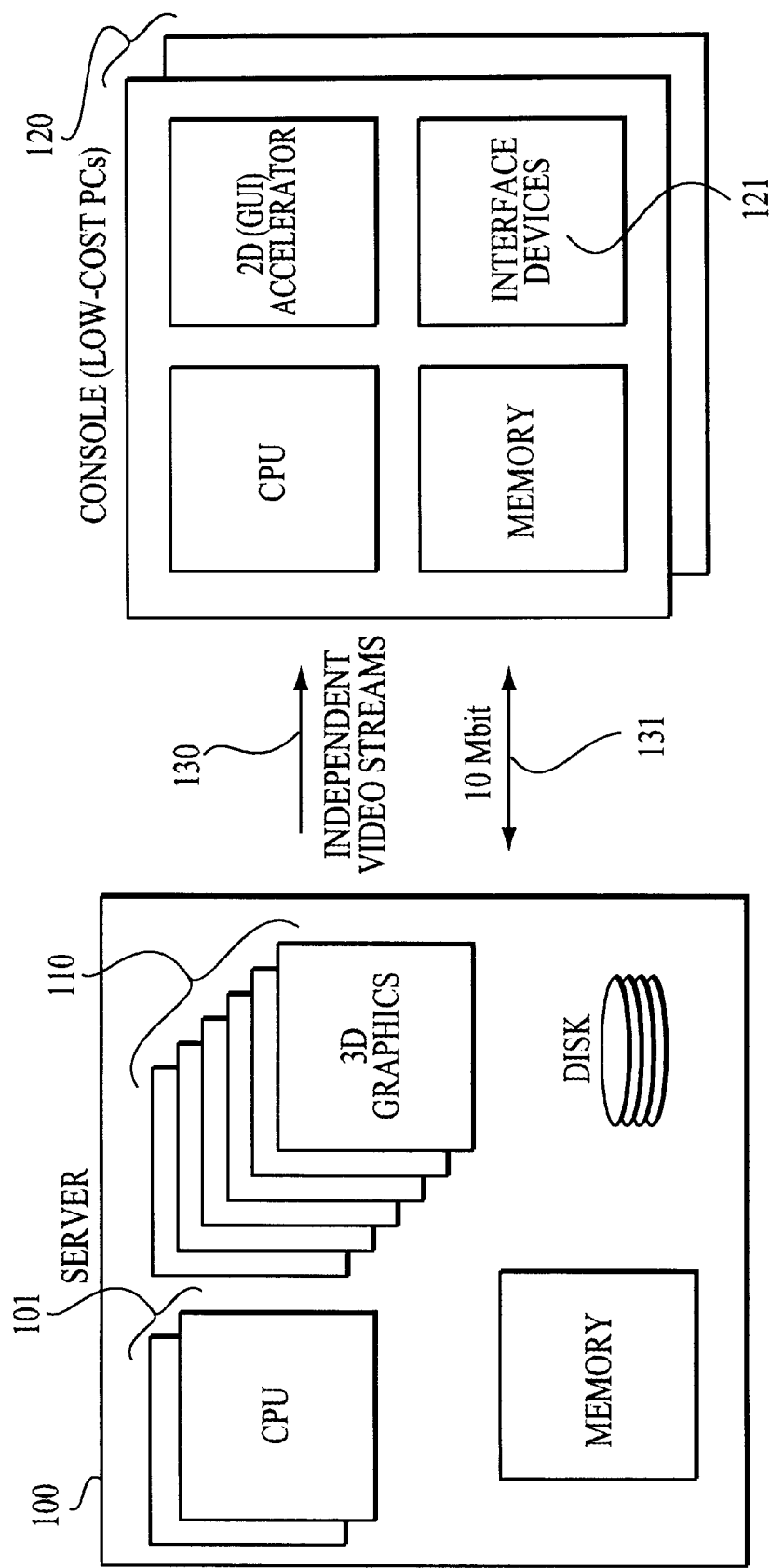
FIG. 1 is a schemtic of a client-server architecture in accordance with the invention.

Although low-cost versions of 3D technology can be produced and integrated with standard processors and Personal Computer (PC) architectures, the nature of the technology and software content appetite is such that any implementation will be a temporary solution until the fidelity of the human eye and rendering of common natural scenes are approached. Even given the remarkable march of technology over the past 10 years and continued progress at a vigorous pace, this will not likely occur until well into the 21'st century, if ever.

Effective distributed content delivery requires a terminal, console, computer, or set-top at the premises of the customer for computation, display, and interaction. The price of this product and its need to maintain technological currency are key challenges facing any industry attempting to rely on mass-market 3D graphics.

The invention eliminates or significantly reduces the impact of each of the above problems by placing the image generation hardware in the central server. The basis for this invention is the observation that 3D graphics is the most dynamic technology involved in content delivery in the near future, and isolation of its resource requirements allows several cost-savings and operational optimizations.

The invention allows the placement of off-the-shelf 3D graphics in the server, using standard interfaces for hardware and software connectivity. This innovation effectively redistributes the 3D hardware that would otherwise go into each and every customer unit, allowing sharing of that resource and reduction of the per user cost. It also shares all the other benefits of central resources, removing the customer from the costly and frustrating maintenance/upgrade cycle, as well as standardizing the target platform. We have implemented a prototype of this configuration.

In the invention, the application executes in multiple locations simultaneously. Turning now to FIG. 1, the user interface 121 (display and devices to communicate with the program, such as keyboards and joysticks) were implemented on standard low-cost Personal Computers 120 (33 Mhz 486). These were connected to the server 100 (in this case a Silicon Graphics Onyx Server with 2 processors 101 and Reality Engine II graphics) via standard Ethernet cables for network communication 131. A separate visual network 130 sending 3D images to the user consisted of standard video (RGB) cables over the remote distance. The application itself was distributed between the PC 120 and the server 100, with user commands and interaction creating instructions that were passed to the server, resulting in creation of images which were in turn passed back to the user.

In a commercial implementation of this prototype, the video cables we used for video transmission would be replaced with a data network that would send compressed, encoded images (such as MPEG 2) to the user PC or console, which would have a standard decoder (such as an MPEG 2 chipset) for decompression into the local display. Upstream information from the user would be sent in a fashion similar to that used in the prototype. The specific software application and its methodologies are independent from the invention and its architecture. As in our prototype, the operating systems and applications may be diverse, as long as they functionally interconnect.

Related Implementations

In the X Window System distributed graphics model, developed at project Athena at MIT in the 1980's, a protocol is used to communicate actual drawing commands to remote hardware, which generates the graphics. Extensions to the original 2-dimensional protocol included functions borrowed from the ANSI standard PHIGS (Programmers Heirarchical Interactive Graphics System), modified as PEX (PHIGS Extension to X). Unlike the invention, this 3D model still requires sophisticated graphics hardware at each remote terminal.

Distributed multi-channel visual systems used in military and commercial visual simulation employ the same basic model as the invention, as do some virtual reality displays using derivative technology. Unlike these systems, this invention outlines a solution to general purpose, wide-scale implementations, combining new hardware and software capabilities to form a mass-market solution for distributed 3D graphics.

The technique of the invention requires not only the partitioning of the 3D graphics function, but also distributed integration of the associated interface and display functions. It also requires enough data bandwidth to deliver complete images in a low-latency, real-time manner to the consumer's premises.

Although such an infrastructure is not currently in place for the mass-market, it is envisioned and in early stages of implementation by major providers of services. The advances in network infrastructure and software technology required to completely implement the invention in a commercially oriented consumer environment will be available.

The cost benefits of the invention are reduced when the usage ratios by the customer of simultaneous 3D graphics increases. For example, if every single customer required simultaneous access to 3D services, the same amount of 3D hardware is required as the alternative user-premise solution. However, centralization benefits would still be present. Simultaneous access is unlikely, and would be analogous to every phone customer picking up the phone and making simultaneous connections, which is beyond the phone network capacity, and has proven not to be a serious statistical consideration.

Additional resources at the server are necessary to support the 3D application. Additional CPU cycles are necessary, with corresponding demands on memory and I/O systems. Additionally, compression technology must be employed, and the graphics output must be switched into the network distribution system. However, these demands would create incremental increases in present services. The processor, CPU, and memory resources in a server are already amortization of the equivalent resources that would be required at the remote unit for the same function. The requirement to deliver encoded video streams for either entertainment or visual communication applications necessitates the compression and switching functions already be in place.

As the resolution requirements of 3D application increase, so will the bandwidth requirements for transmission of these images. For example, MPEG 1 video compression may require less than 2 Mbits per second, but MPEG 2 will likely require average rates closer to 6 Mbits/second. When higher definition television standards are widespread, rates will climb still higher. These advances will require suitable infrastructure be in place. The problem of bandwidth is a general one, not specific to this implementation.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An architecture for delivering up-to-date graphics technology to a mass market, comprising:

graphics means for generating 3D images for human users in real time, said graphics technology being usable by a plurality of applications;

a central server for locating multiple instances of said graphics means;

a plurality of distributed consoles for display of said real-time 3D images to said users and for communicating with said server;

means for allocating said applications between said server and said distributed consoles;

a high speed communication channel for transmitting said real-time 3D images from said server to said console;

a network communication channel for communication between said user at said console and said server, and for executing functions of said applications allocated to said console;

means for switching each of said multiple instances to an active one of said plurality of applications and to an active one of said plurality of consoles;

wherein said graphics technology may be configured at said server to accommodate improvements in said graphics means without requiring improvements in said consoles, and wherein said applications may be responsive to said improvements in graphics technology without increasing said functions allocated to said consoles.

* * * * *